United States Patent
Sheng et al.

(10) Patent No.: US 8,274,712 B2
(45) Date of Patent: Sep. 25, 2012

(54) SCANNING APPARATUS FOR BOUND DOCUMENT

(75) Inventors: Thomas Sheng, Hsinchu County (TW); Su-Wei Ho, Taichung County (TW); Shang-Hsien Tsai, Chiayi County (TW)

(73) Assignee: Avision Inc. (TW)

( * ) Notice: Subject to any disclaimer, the term of this patent is extended or adjusted under 35 U.S.C. 154(b) by 559 days.

(21) Appl. No.: 12/511,021

(22) Filed: Jul. 28, 2009

(65) Prior Publication Data

US 2010/0214627 A1    Aug. 26, 2010

(30) Foreign Application Priority Data

Feb. 24, 2009  (TW) .................................. 98105790 A

(51) Int. Cl.
    *H04N 1/04* (2006.01)
(52) U.S. Cl. ........ 358/474; 358/475; 358/509; 358/494; 399/211; 399/212; 382/318
(58) Field of Classification Search .................. 358/474, 358/509, 506, 488, 475, 497; 399/211, 212, 399/362, 380, 379; 382/318, 319
See application file for complete search history.

(56) References Cited

U.S. PATENT DOCUMENTS

| | | | | |
|---|---|---|---|---|
| 4,866,486 A | * | 9/1989 | Higashio et al. | 399/184 |
| 4,972,271 A | * | 11/1990 | Koumura | 358/300 |
| 5,359,207 A | * | 10/1994 | Turner | 257/81 |
| 5,555,077 A | * | 9/1996 | Schooley | 399/81 |
| 5,712,718 A | * | 1/1998 | Chen | 359/201.1 |
| 5,751,461 A | * | 5/1998 | Chen et al. | 359/201.1 |
| 5,847,846 A | * | 12/1998 | Wu et al. | 358/475 |
| 6,144,475 A | * | 11/2000 | Sheng | 359/196.1 |
| 6,587,227 B1 | * | 7/2003 | Fullerton | 358/474 |
| 7,233,419 B2 | * | 6/2007 | Chang | 358/475 |
| 7,268,923 B2 | * | 9/2007 | Schroath et al. | 358/474 |
| 7,538,915 B2 | * | 5/2009 | Lee et al. | 358/497 |
| 7,733,548 B2 | * | 6/2010 | Makino et al. | 358/520 |
| 7,843,611 B2 | * | 11/2010 | Albahri | 358/474 |
| 2004/0218231 A1 | * | 11/2004 | Sheng et al. | 358/474 |
| 2008/0316548 A1 | * | 12/2008 | Yamauchi et al. | 358/475 |
| 2009/0021804 A1 | * | 1/2009 | Park | 358/497 |

* cited by examiner

*Primary Examiner* — Negussie Worku

(57) ABSTRACT

A scanning apparatus for scanning a bound document includes a scanning flatbed, a lighting device, and a scanning head assembly. The scanning flatbed includes a platen and an inclined plane, wherein the platen is adjoined with the inclined plane, and the platen supports a document to be scanned. The lighting device, facing the scanning flatbed, projects light onto the document, wherein the lighting device includes a first portion and a second portion, and the first portion and the second portion respectively comprise a plurality of LEDs arranged in an array. The scanning head assembly, coupled to the lighting device, scans the document. The first portion is located closer to the inclined plane than the second portion, and intervals between the LEDs of the first portion are smaller than intervals between the LEDs of the second portion.

10 Claims, 5 Drawing Sheets

SCANNING APPARATUS FOR BOUND DOCUMENT

BACKGROUND OF THE INVENTION

1. Field of the Invention

The present invention relates to a scanning apparatus for scanning a bound document, and more particularly, to a scanning apparatus which can provide a sufficient illumination to a to-be-scanned page of a bound document.

2. Description of the Prior Art

A scanner is utilized for scanning a document and acquiring an image of the document. Because a book is one kind of bound document, a binding area of the book will make a page of the book unable to flatly lie on a scanning window of the scanner when the book is placed on the scanning window, thereby causing distortion to an acquired image. Therefore, a book scanner has been designed so that the portion of the page which is close to the binding area can be scanned without distortion. As shown in FIG. 1, the book scanner has an inclined plane and a scanning window, and an included angle is formed between the inclined plane and the scanning window. FIG. 1 is a side view of a book scanner 100 of prior art. The book scanner 100 includes a scanning window 102, an inclined plane 104, a lamp 106, and a scanning head assembly 108. To explain operating principles of the book scanner 100, a book 110 to be scanned is also shown in FIG. 1. An included angle Θ is formed between the scanning window 102 and the inclined plane 104, so that a to-be-scanned page 110a of the book 110 can flatly lie on the scanning window 102. The lamp 106 is coupled to the scanning head assembly 108, and the lamp 106 will move with the scanning head assembly 108 along the X-axis to provide an illumination to the page 110a. Additionally, in order to provide a sufficient illumination to the portion of the page 110a close to the included angle Θ, the lamp 106 positioned below the scanning window 102 and the inclined plane 104 is designed to have a bent angle to compensate the weaker light intensity at an endpoint of the lamp 106. As a result, the binding area of the to-be-scanned book 110 can have a sufficient illumination. The lamp 106 is usually bent by an angle approximately equal to the included angle Θ between the scanning window 102 and the inclined plane 104. However, the cost of the bent lamp 106 is higher than a straight lamp, and the bent angle of the lamp 106 needs to be customized to agree with the included angle Θ. As a result, the complexity in assembly and cost of the book scanner 100 will be increased. Therefore, how to achieve a light source of the book scanner 100 with a lower cost and provide a sufficient illumination to a page of a book is an urgent issue for the scanner industry.

SUMMARY OF THE INVENTION

Therefore, one of the objectives of the present invention is to provide a scanning apparatus for scanning a bound document which can provide a sufficient illumination to a page to be scanned.

According to the objective of the present invention, a scanning apparatus for scanning a bound document is disclosed. The scanning apparatus comprises a scanning flatbed, a lighting device, and a scanning head assembly. The scanning flatbed includes a platen and an inclined plane, wherein the platen is adjoined with the inclined plane, and the platen supports a document to be scanned. The lighting device, facing the scanning flatbed, projects light onto the document, wherein the lighting device includes a first portion and a second portion, and the first portion and the second portion respectively comprise a plurality of LEDs arranged in an array. The scanning head assembly, coupled to the lighting device, scans the document. The first portion is located closer to the inclined plane than the second portion, and intervals between the LEDs of the first portion are smaller than intervals between the LEDs of the second portion.

According to the present invention, another scanning apparatus for scanning a bound document is disclosed. The scanning apparatus comprises a scanning flatbed, a lighting device, and a scanning head assembly. The scanning flatbed includes a platen and an inclined plane, wherein the platen is adjoined with the inclined plane, and the platen supports a document to be scanned. The lighting device, facing the scanning flatbed, projects light onto the document, wherein the lighting device includes a first portion and a second portion, and the first portion and the second portion respectively comprise a plurality of LEDs arranged in an array. The scanning head assembly, coupled to the lighting device, scans the document. The first portion is located closer to the inclined plane than the second portion, and the first portion is located closer to the platen than the second portion.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
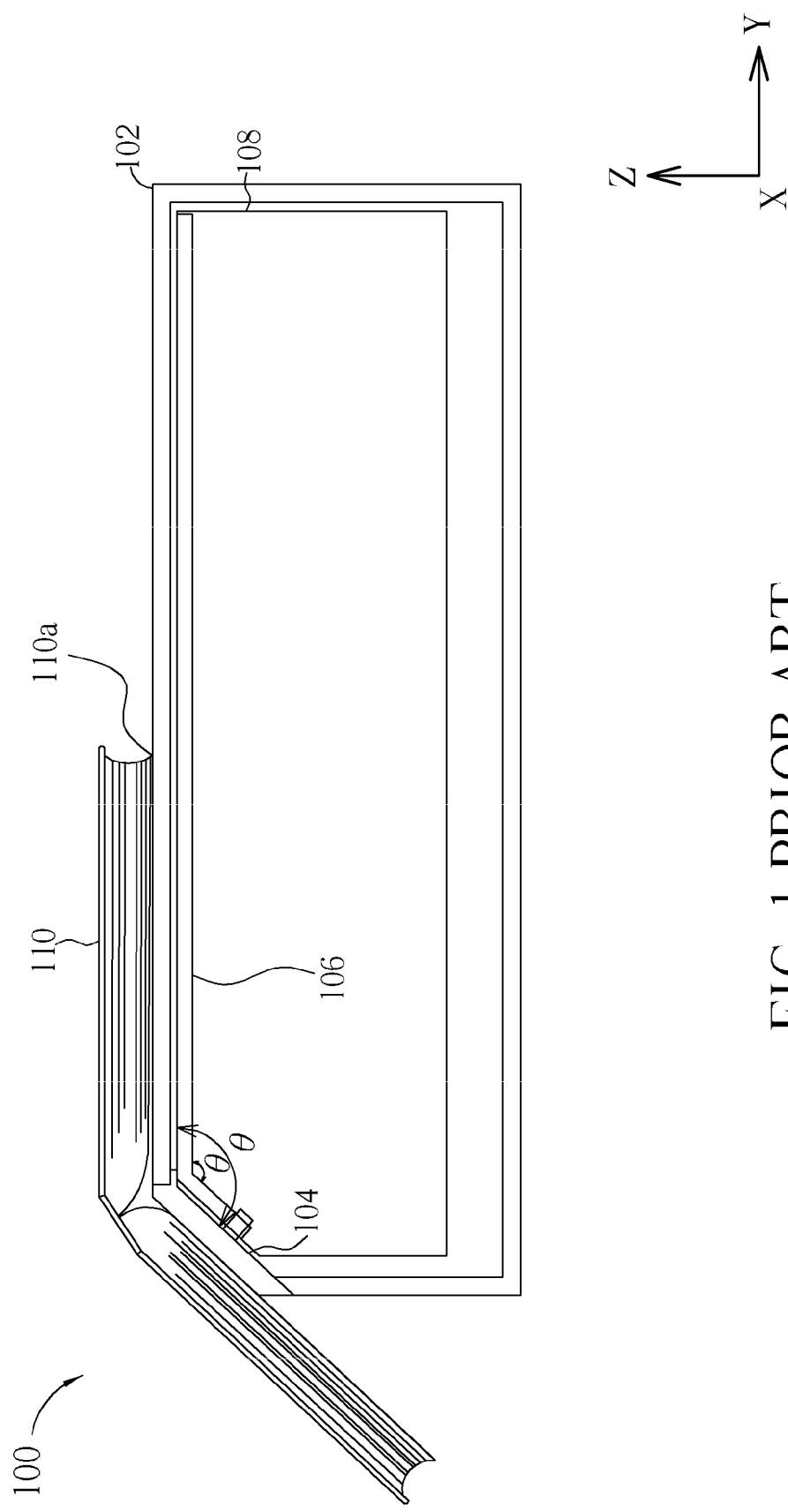
FIG. 1 is a side view of a book scanner of prior art.
Figure 2:
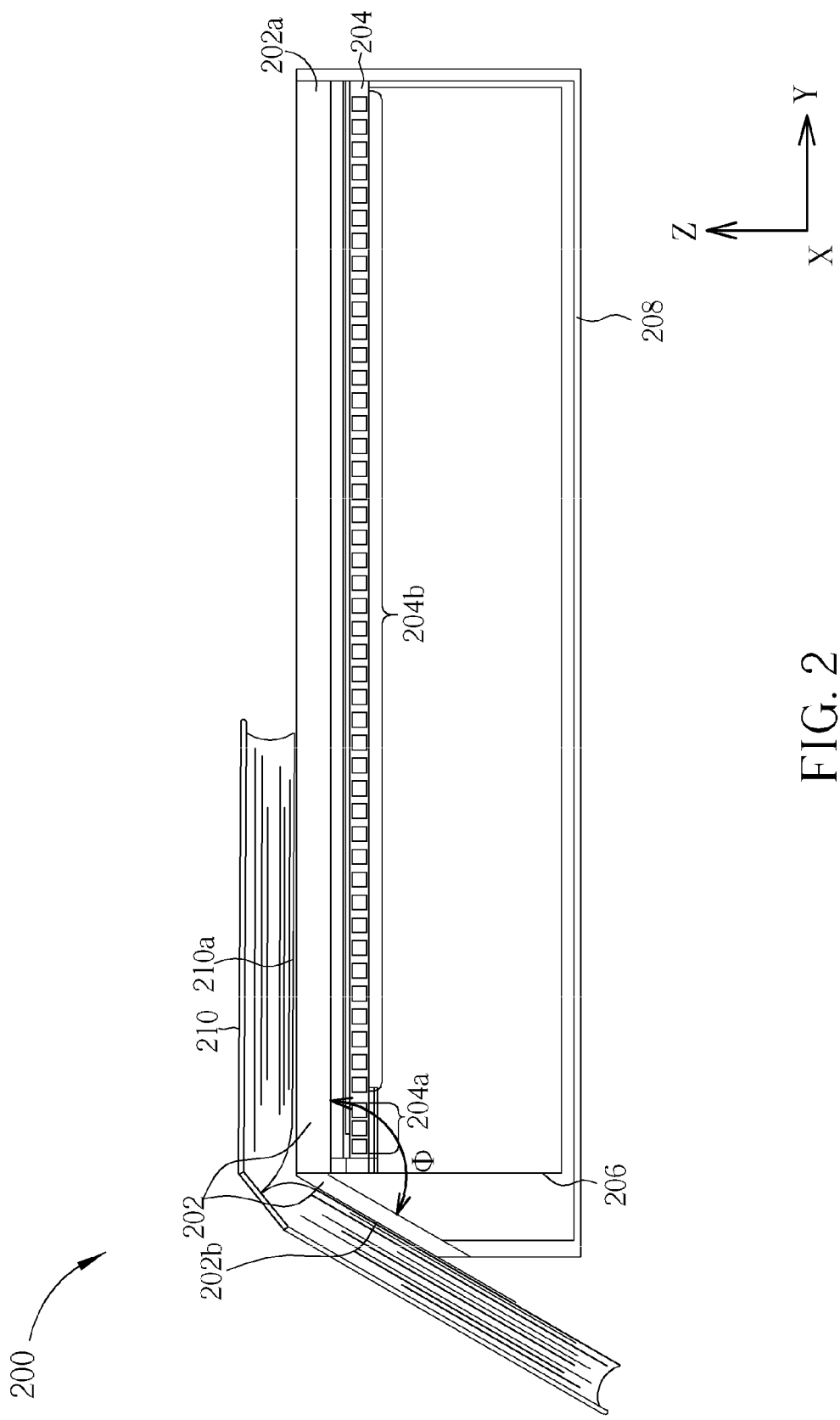
FIG. 2 is a diagram illustrating a scanning apparatus for scanning a bound document according to an embodiment of the present invention.

Please refer to FIG. 2. FIG. 2 is a diagram illustrating a scanning apparatus 200 for scanning a bound document according to an embodiment of the present invention. This preferred embodiment of the present invention will be described in detail with reference to the accompanying drawings. However, it is to be noted that the scope of the present invention is not limited by this embodiment. The scanning apparatus 200 includes a scanning flatbed 202, a lighting device 204, a scanning head assembly 206, and a scanner housing 208. The scanning flatbed 202 supports a document 210 to be scanned. The scanning flatbed 202 includes a platen 202a and an inclined plane 202b, wherein the platen 202a is a transparent platform which supports the document 210. The platen 202a is adjoined with the inclined plane 202b, and there is an included angle Φ formed between the platen 202a and the inclined plane 202b. The lighting device 204 is installed so that the lighting device 204 faces the scanning flatbed 202. The lighting device 204 projects light onto the document 210, wherein the lighting device 204 will generate the light which has an asymmetric light distribution when the lighting device 204 is active, and the light intensity of a portion of the lighting device 204 closer to the included angle Φ is higher than other portions of the lighting device 204. The scanning head assembly 206, coupled to the lighting device 204, scans the document 210. The lighting device 204 will move with the scanning head assembly 206 along the X-axis when the scanning apparatus 200 scans a page 210a of the document 210, and provide a sufficient illumination to the page 210a. The present invention is not limited by the principle of the scanning head assembly 206. In this exemplary embodiment, the scanning head assembly 206 comprises a charge-coupled device (CCD) sensor. In other embodiments of the present invention, the scanning head assembly can comprise a contact image sensor (CIS).

Figure 3:
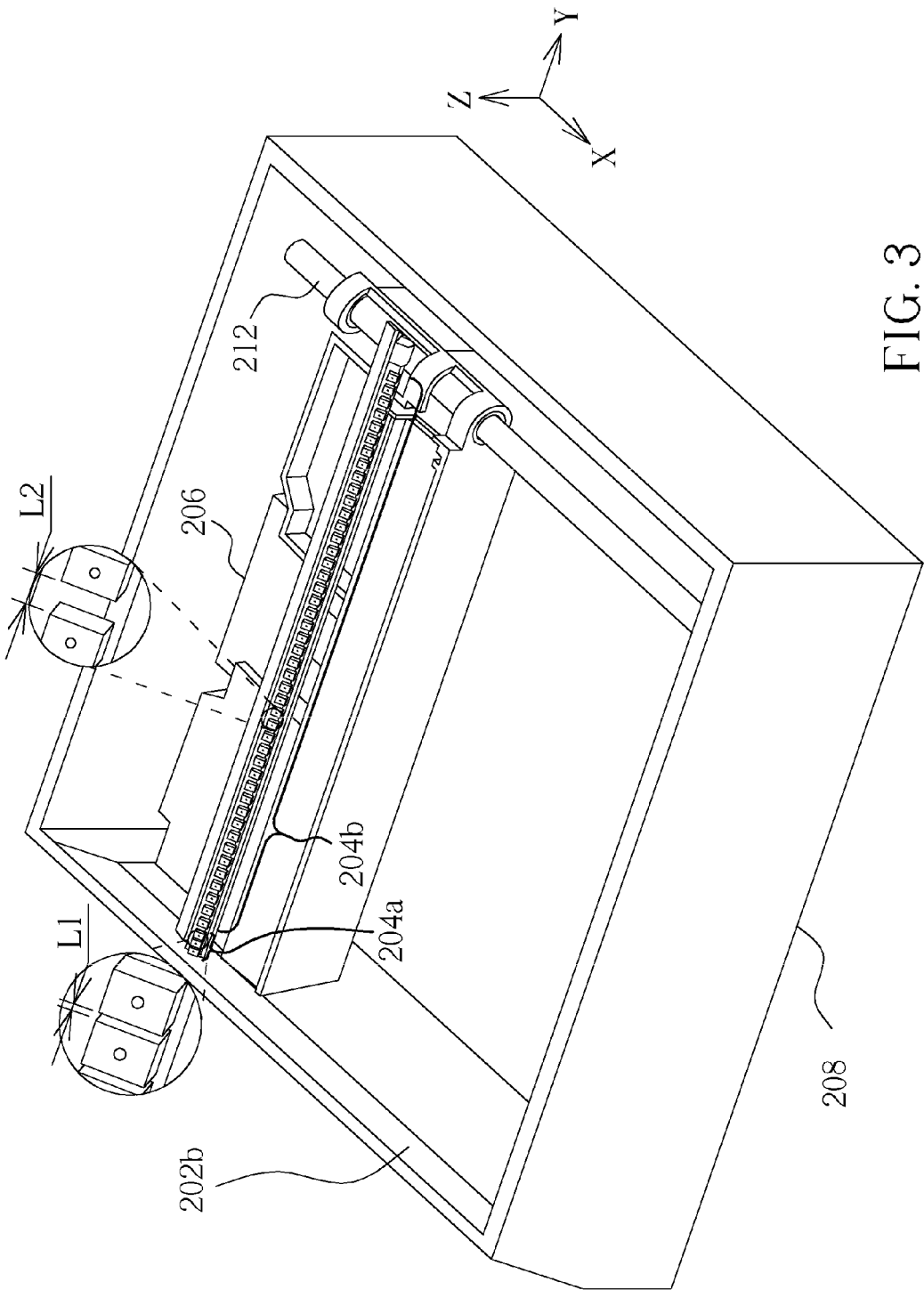
FIG. 3 is a diagram illustrating an embodiment of a lighting device of the scanning apparatus shown in FIG. 2.
Figure 4:
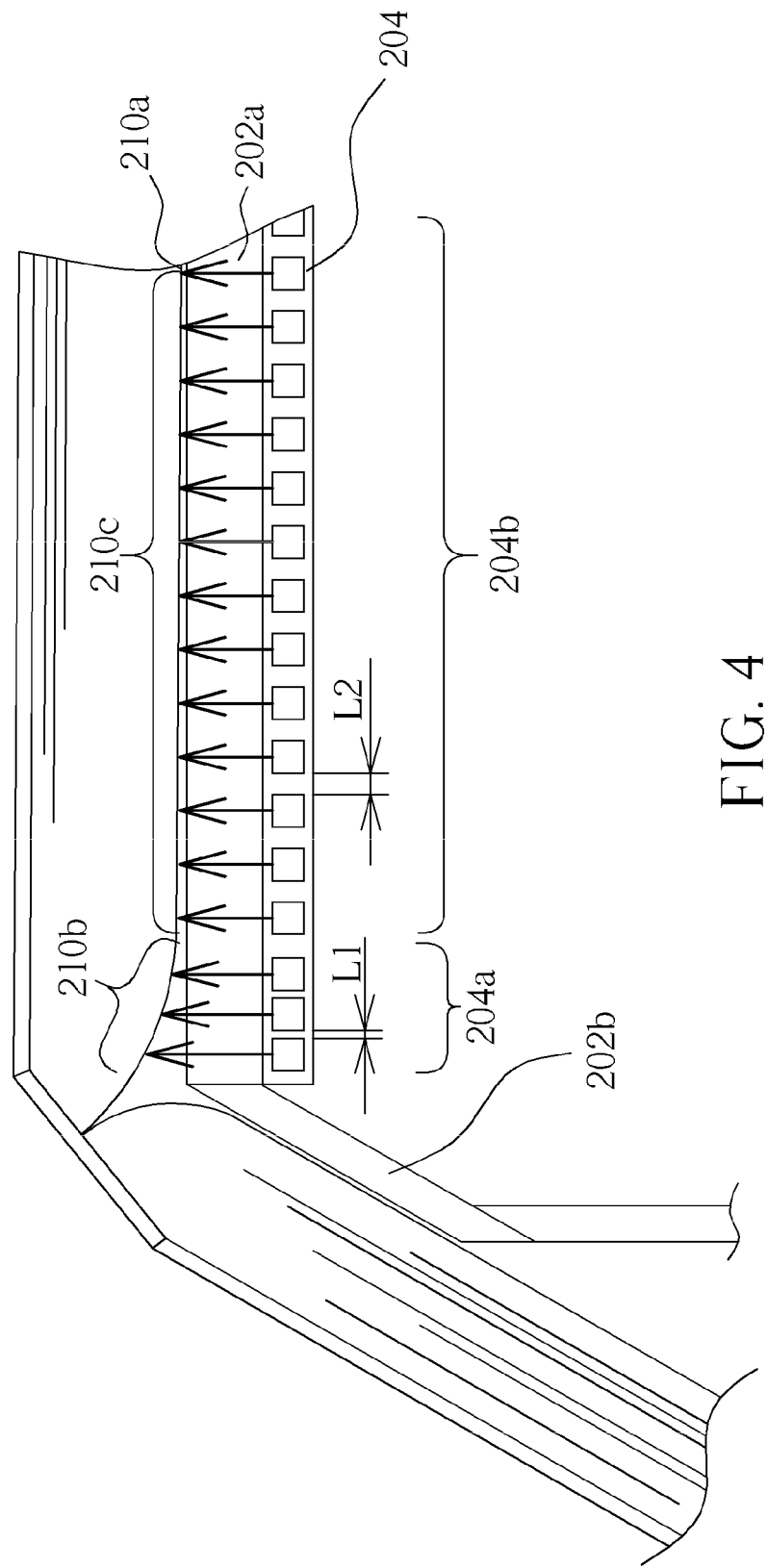
FIG. 4 is a partial enlargement of FIG. 2 and illustrates a light distribution of light generated when the lighting device shown in FIG. 2 is active.

Please refer to FIG. 3 and FIG. 4. FIG. 3 is a diagram illustrating an embodiment of the lighting device 204 shown in FIG. 2. The lighting device 204 includes a first portion 204a and a second portion 204b. The first portion 204a comprises a plurality of LEDs arranged in an array, and the second portion 204b also comprises a plurality of LEDs arranged in an array. The LEDs of the two portions 204a and 204b are arranged in a straight line; however, this is not meant to be a limitation of the present invention. Any arrangement which arranges the LEDs of the first portion 204a and the second portion 204b at the same horizontal height to thereby produce an asymmetric light distribution should be considered within the scope of the present invention. Additionally, the first portion 204a are located closer to the included angle Φ than the second portion 204b, and intervals L1 between the neighboring LEDs of the first portion 204a are smaller than intervals L2 between the neighboring LEDs of the second portion 204b (i.e. L1<L2). A control block (not shown) will control the scanning head assembly 206 and the lighting device 204 to move along a fixed rod 212 in the X-axis direction when the scanning apparatus 200 scans the page 210a of the document 210.

Because the intervals L1 between the neighboring LEDs of the first portion 204a is smaller than the intervals L2 between the neighboring LEDs of the second portion 204b, the light intensity generated by the first portion 204a is higher than the light intensity generated by the second portion 204b when the lighting device 204 is active.

FIG. 4 is a partial enlargement of FIG. 2 and illustrates the light distribution of the light generated when the lighting device 204 shown in FIG. 2 is active. The density of the arrows represents the light intensity. When the document 210 is to be scanned, a user puts the to-be-scanned page 210a of the document 210 on the platen 202a. As shown in FIG. 4, a page portion 210b of the page 210a close to the binding area can not flatly lie on the platen 202a, and thus the page portion 210b will be illuminated more difficultly than other page portions, such as a page portion 210c. However, as described hereinbefore, the light intensity of the lighting device 204 close to the included angle Φ is higher, so the page portion 210b still can be well illuminated like other page portions of the page 210a. Thereby, a precise and clear scanning result can be acquired. Please note that a person skilled in the art can readily understand that using the density of the arrows to represent the light intensity in this embodiment is only for describing the spirit of the present invention more clearly, and is not meant to be a limitation of the present invention.

Figure 5:
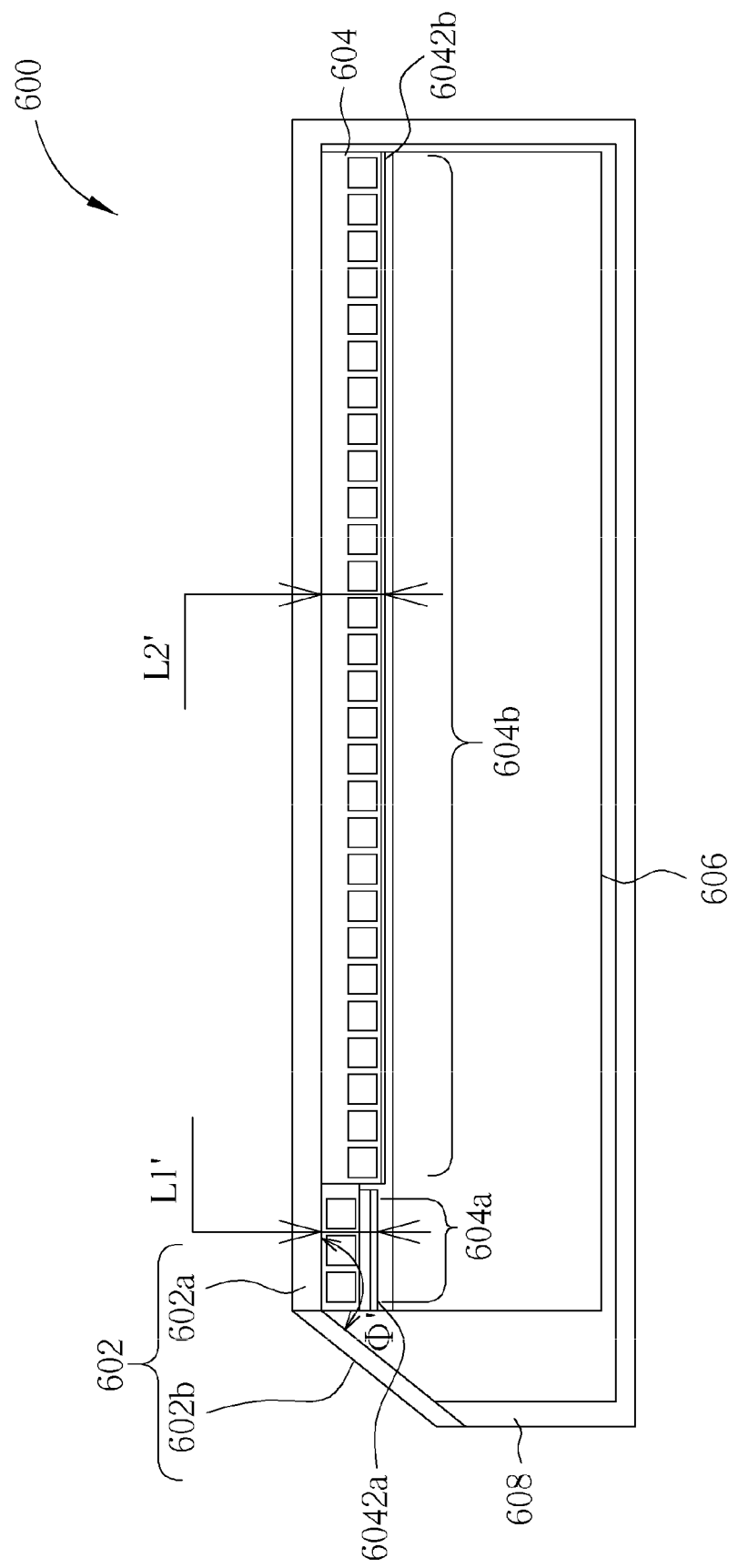
FIG. 5 is a diagram illustrating a scanning apparatus for scanning a bound document according to another embodiment of the present invention.

Please refer to FIG. 5. FIG. 5 is a diagram illustrating a scanning apparatus 600 for scanning a bound document according to another embodiment of the present invention. The scanning apparatus 600 includes a scanning flatbed 602, a lighting device 604, a scanning head assembly 606, and a scanner housing 608. Please note that, detailed description of the function and design which are similar to those of the previous embodiment is omitted here for brevity. A first portion 604a of the lighting device 604 is located closer to a platen 602a than a second portion 604b of the lighting device 604. The first portion 604a and the second portion 604b respectively comprise a plurality of LEDs arranged in an array, and the LEDs of these two portions 604a and 604b are arranged in a straight line. The LEDs of the first portion 604a of the lighting device 604 are disposed on a first carrier 6042a, and the LEDs of the second portion 604b of the lighting device 604 are disposed on a second carrier 6042b. The first carrier 6042a is located closer to the platen 602a than the second carrier 6042b. It should be noted that the placement of the first carrier 604a and the second carrier 6042b is not limited to this embodiment. Those skilled in the art can readily understand that any placement which disposes the first carrier 6042a and the second carrier 6042b at different horizontal heights should also be considered within the scope of the present invention. As shown in FIG. 5, the distance between the first carrier 6042a and the platen 602a is L1', and the distance between the second carrier 6042b and the platen 602a is L2', wherein L2' is greater than L1'. Please note that the scanning apparatus 600 of the present invention is not limited by the distribution density of the LEDs disposed on the first carrier 6042a and the LEDs disposed on the second carrier 6042b. For example, the distribution density of the LEDs disposed on the first carrier 6042a can be equal to or higher than the distribution density of the LEDs disposed on the second carrier 6042b.

Because the LEDs of the first portion 604a disposed on the first carrier 6042a are located closer to the platen 602a, the illumination provided by the first portion 604a will be higher than the illumination provided by the second portion 604b disposed on the second carrier 6042b when the lighting device 604 is active. Thus, the page portion 210b which is difficult to be illuminated still can get sufficient illumination like other page portions of the page 210a.

In summary, according to the present invention, a light source providing a sufficient illumination to a page of a bound document can be achieved via utilizing a plurality of LEDs, and intervals between the LEDs can be adjusted arbitrarily to provide a uniform illumination to the page of the bound document. Furthermore, the cost and the power consumption of the light source comprising the LEDs are lower than a bent fluorescent lamp of prior art, so the cost and the power consumption of a scanning apparatus for scanning a bound document can be decreased significantly.

Those skilled in the art will readily observe that numerous modifications and alterations of the device and method may be made while retaining the teachings of the invention.

What is claimed is:
1. A scanning apparatus, comprising:
  a scanning flatbed, comprising a platen and an inclined plane, wherein the platen is adjoined with the inclined plane, and the platen is utilized for supporting a document to be scanned;
  a lighting device, facing the scanning flatbed, for projecting light onto the document, wherein the lighting device comprises a first portion and a second portion, and the first portion and the second portion respectively comprise a plurality of LEDs arranged in an array; and
  a scanning head assembly, coupled to the lighting device, for scanning the document;
  wherein the first portion is located closer to the inclined plane than the second portion, and intervals between the LEDs of the first portion are smaller than intervals between the LEDs of the second portion.

2. The scanning apparatus of claim 1, wherein the platen and the inclined plane form an included angle, and the first portion is located closer to the included angle than the second portion.

3. The scanning apparatus of claim 1, wherein the LEDs of the first portion and the LEDs of the second portion are arranged in a straight line.

4. The scanning apparatus of claim 1, wherein the LEDs of the first portion and the LEDs of the second portion are arranged at the same horizontal height.

5. The scanning apparatus of claim 1, being a book scanner.

6. A scanning apparatus, comprising:
   a scanning flatbed, comprising a platen and an inclined plane, wherein the platen is adjoined with the inclined plane, and the platen is utilized for supporting a document to be scanned;
   an lighting device, facing the scanning flatbed, for projecting light onto the document, wherein the lighting device comprises a first portion and a second portion, and the first portion and the second portion respectively comprise a plurality of LEDs arranged in an array; and
   a scanning head assembly, coupled to the lighting device, for scanning the document;
   wherein the first portion is located closer to the inclined plane than the second portion, and the first portion is located closer to the platen than the second portion.

7. The scanning apparatus of claim 6, wherein the LEDs of the first portion are disposed on a first carrier, the LEDs of the second portion are disposed on a second carrier, and the first carrier is located closer to the platen than the second carrier.

8. The scanning apparatus of claim 7, wherein the first carrier and the second carrier are arranged at different horizontal heights.

9. The scanning apparatus of claim 6, wherein the LEDs of the first portion and the LEDs of the second portion are arranged in a straight line.

10. The scanning apparatus of claim 6, being a book scanner.

* * * * *